June 3, 1958    O. D. ENGLEHART ET AL    2,837,453
PRELIMINARY PRESSING OF LAMINATED GLASS
Filed Aug. 19, 1955    3 Sheets-Sheet 1

INVENTORS
OSCAR D. ENGLEHART
JOHN R. SADESKY
JOHN W. MORRIS and
BY ROY S. SHERBONDY Oscar L. Spencer
ATTORNEY June 3, 1958  O. D. ENGLEHART ET AL  2,837,453
PRELIMINARY PRESSING OF LAMINATED GLASS
Filed Aug. 19, 1955  3 Sheets-Sheet 3

INVENTORS
OSCAR D. ENGLEHART
JOHN R. SADESKY
BY JOHN W. MORRIS and
ROY S. SHERBONDY Oscar L. Spencer
ATTORNEY June 3, 1958  O. D. ENGLEHART ET AL  2,837,453
PRELIMINARY PRESSING OF LAMINATED GLASS
Filed Aug. 19, 1955  3 Sheets-Sheet 2

INVENTORS
OSCAR D. ENGLEHART
JOHN R. SADESKY
JOHN W. MORRIS and
BY ROY S. SHERBONDY Oscar L. Spencer
ATTORNEY

United States Patent Office 2,837,453
Patented June 3, 1958

2,837,453
PRELIMINARY PRESSING OF LAMINATED GLASS

Oscar D. Englehart, Brackenridge, John R. Sadesky and John W. Morris, Tarentum, and Roy S. Sherbondy, New Kensington, Pa., assignors to Pittsburgh Plate Glass Company Application August 19, 1955, Serial No. 529,522

19 Claims. (Cl. 154—2.70)

This invention relates to the preliminary pressing of laminated glass assemblies comprising two sheets of glass, each flat or curved, and a thermoplastic interlayer. It is especially useful in the preliminary pressing simultaneously of a group of small flat or curved laminated glass assemblies and has special application in the preliminary pressing of large curved laminated glass assemblies, e. g., those that are suitable for use in windshields of automobiles.

In the lamination of glass assemblies, it is customary to seal or bond the thermoplastic interlayer to the two sheets of glass by the application of heat and pressure, e. g., in an autoclave using a fluid, such as an oil, at a high temperature and subjected to a high pressure. In order to carry out this pressing or sealing of the interlayer to the two sheets of glass, it is first necessary to prepress or seal a marginal area of the assembly before the assembly is placed in the fluid in the autoclave; otherwise, fluid will penetrate into the laminate and be trapped therein during the lamination thereby spoiling the appearance of the laminated assembly. In addition, the prepressing operation is necessary to remove to the maximum extent possible air between the interlayer and the two sheets of glass; otherwise, air will be trapped in the final product in the form of air bubbles and this likewise will detract from the appearance of the laminated assembly.

In order to prepress at least a marginal area of the laminated glass assembly to prepare it for the final pressing in the autoclave, methods have heretofore been developed to exclude the air from between the plastic interlayer and the sheets of glass and to prepress or bond at least a marginal area of the laminated glass assembly. To accomplish this prepressing for flat laminated assemblies, the assembly has been heated and passed between a pair of resilient nipper rolls and the product therefrom then was subjected to the autoclave operation. For a flat laminated assembly, when the laminate comprised more than two sheets of glass and more than one sheet of thermoplastic interlayer or for a laminated assembly that was curved, it was found to be necessary to place the laminated assembly in an oil-resistant bag. The bag was then sealed and air evacuated therefrom. Then the evacuated bag with contents sealed therein was immersed in the oil in the autoclave for the final pressing. For the manufacture of a large number of small laminated assemblies the method of placing in the bag, sealing, evacuating and subjecting to the autoclave operation required a large amount of manual labor.

When the large curved laminated glass assemblies, such as windshields, were prepressed in the marginal area by heating and passing through a pair of yieldable nipper rolls, difficulties were encountered that required the development of complex prepressing apparatus. For the wrap-around wind-shield, in which the portion of the end sections adjacent to the central section had the smallest radius of curvature, with or without a very gradual transverse curvature in the central section, even more complex apparatus using nipper rolls was required to prepress the windshields in order to eliminate manual guiding of the windshields through the pair of nipper rolls. Still further complexity arose when the windshields were modified. The end sections were twisted about the longitudinal axis in the bending of the flat pattern to produce windshields that had a cylindrical center and conical end sections. Further difficulty in adequately prepressing at least a marginal area of windshield developed when compound-bend type of windshields were produced. These had a transverse curvature as well as longitudinal curvature in at least the central section with or without the twisting of the end sections about the longitudinal axis. A number of modifications of the preliminary pressing apparatus have resulted in satisfactory prepressing of some of these latest designs of wrap-around and compound windshields but these apparatus require modification or some changes when the prepressing apparatus is to change from the prepressing of one type of windshield to another type or pattern. This required the operation of the production line on a given pattern or a given group of patterns of windshields that are sufficiently similar in degree of curvature for an extended period of time to minimize the amount of time lost by required modification of the machine to change to the prepressing of a substantially different pattern of curved windshield.

Before the development of modifications to the preliminary pressing machine using a pair of rolls so that the prepressing apparatus could satisfactorily prepress such curved windshields, it was necessary to subject these curved windshields to the prepressing method described above in which the assembly was placed in an oil-resistant bag followed by evacuation after sealing and then autoclaving. The yield of satisfactorily pressed curved windshields from this operation was not sufficiently high for economic operation. Because of the severe bends of the windshields at the junction of the end sections and the central section and because of the twisting of the end sections about the longitudinal axis, the assemblies, which were inadequately supported at the concave side of the assembly during the evacuation in the bags, a considerable amount of breakage of these curved windshields was encountered. This breakage include a fracture or cracking of the glass. This resulted in an uneconomic operation because such damage to curved windshields could not be detected until the curved windshield in the bag had been through the complete cycle of operation including the pressing in the autoclave.

An apparatus, that has been developed for the preliminary pressing of curved windshields, is disclosed and claimed in U. S. Patent No. 2,673,822 granted to Brook J. Dennison, Laurence A. Keim, and William G. Smith on March 30, 1954. It utilizes a top and bottom frame having a fixed configuration that is dictated by the windshield to be prepressed and thus requires the expensive construction of a number of frames to prepress the various patterns of curved windshield. Also change of frames is necessary for change in the windshield pattern moving along the production line.

Relatively small laminated glass assemblies are being produced in large quantities and a number of these assemblies are being produced for the manufacture of safety goggles. Some of these safety goggles have a spheroidal type of curvature. Such small curved laminated glass assemblies cannot be satisfactorily prepressed in the apparatus containing the pair of yieldable nipper rolls.

It is an object of the present invention to provide a method and apparatus to prepress at least a marginal area of a laminated glass assembly so that it can be satisfactorily pressed by direct immersion in an autoclave of fluid, e. g., oil, and subjected to heat and pressure.

It is a further object of this invention to provide a method and apparatus for the simultaneous preliminary pressing of a group of relatively small laminated glass assemblies.

A further object of the present invention is to provide a method and an apparatus for the preliminary pressing of curved laminated glass assemblies, especially those having a considerably smaller radius of curvature at the end sections adjacent the central section.

Still a further object of this invention is to provide a method and an apparatus for the preliminary pressing of curved laminated glass assemblies having a considerably smaller radius of curvature in the end sections adjacent the central curved section and having the end sections bent or twisted about the longitudinal axis.

It is another object of the present invention to provide a method and an apparatus for the preliminary pressing of curved laminated glass assemblies in which the central section of the laminated assemblies are curved in the transverse axis as well as longitudinally, with or without the end sections having a considerable smaller radius of curvature adjacent the central section and with or without the end sections bent about the longitudinal axis.

A further object of this invention is to provide a method and apparatus for the prepressing of at least a marginal area of laminated glass assemblies so that the assemblies can be placed directly in an oil or the like for autoclave operation thereby eliminating either the difficulties encountered with the use of bags that are sealed and evacuated or the time lost in production by changeover of nipper roll type of apparatus to prepress various patterns.

Another object is to provide a method and apparatus requiring only a slight inexpensive change with change in pattern of windshield in the production line.

Other objects of the invention will be apparent to one skilled in the art from the following description in conjunction with the drawings illustrating the preferred embodiment of the invention. In the drawings, in which like parts are given like numerals:

Figure 1:
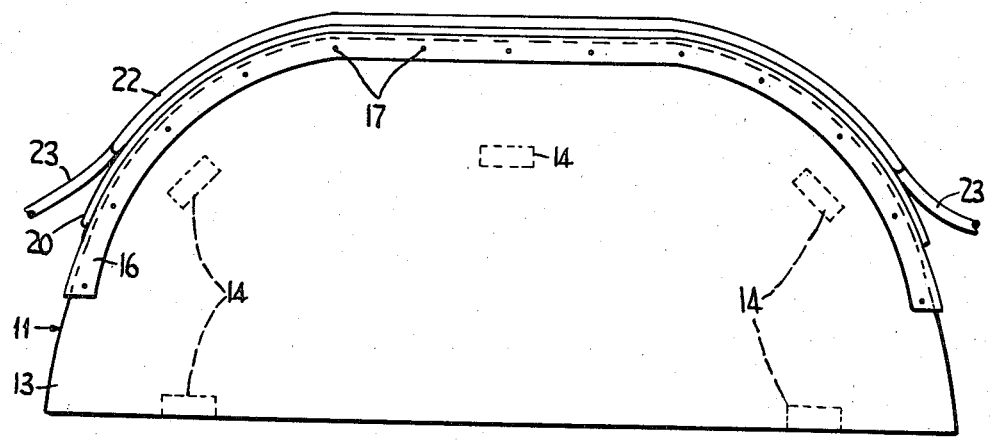
Fig. 1 is a front elevation of the preferred embodiment of the apparatus of the present invention being especially suitable for the preliminary pressing of curved laminated assemblies.
Figure 8:
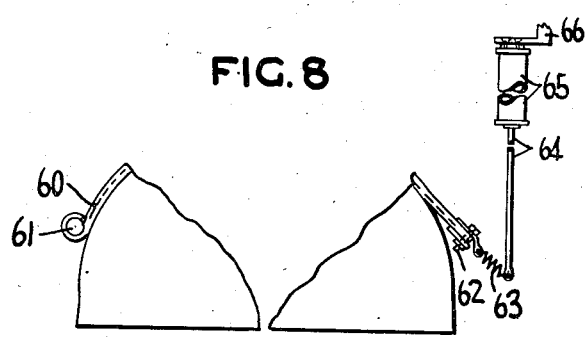
Figure 9:
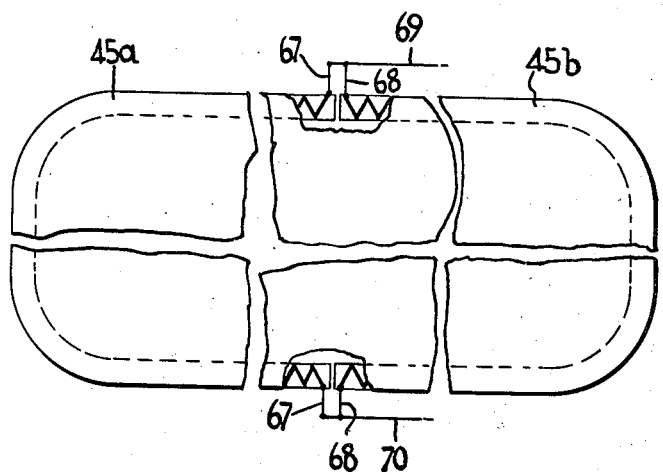

Fig. 8 is a schematic view of a modification of the apparatus of Fig. 1 in which the two top sheets are integral and one end of the integral sheet is fastened for limited movement and the other end is connected to means for mechanically raising the sheet to permit easy insertion and removal of the laminated assembly; and Fig. 9 is a partial top plan view of the apparatus of the invention and partially broken away to show an alternate embodiment of the perimeter flexible strip or band heater using two band heaters electrically connected in parallel to constitute two sections of the perimeter heating element.

In accordance with the present invention, a laminated glass assembly comprising two sheets of glass and a thermoplastic interlayer is supported on a flexible sheet within the area of the sheet that is defined by a continuous rib on its top surface. The assembly is placed so that it is spaced from the rib. A flexible cover sheet having dimensions sufficiently large to completely cover, even during evacuation, the entire area occupied by the rib is placed over the laminated assembly. The two flexible sheets cooperate with the rib to provide a conduit between the rib and the periphery of the laminated assembly. In the method this conduit is evacuated through the rib while maintaining at least part of the conduit in order to evacuate air from between the plastic interlayer and the sheets of glass. The assembly is then heated in at least the marginal area while maintaining vacuum between the two flexible sheets. After sufficient heating of the assembly to seal at least the marginal area, the vacuum is released and the flexible cover sheet is removed followed by the removal of the laminated glass assembly. The assembly has been sufficiently prepressed by this method so that it can be placed in the autoclave in the fluid for final pressing by heat and pressure without the fluid penetrating between the glass sheets and the plastic interlayer.

In the method of this invention a wide variation in the temperature and the vacuum can be utilized as conditions for prepressing without sacrificing a high yield of satisfactory prepressed laminated assemblies. For example, the temperature of heating can range from 200 to 500° F. and the amount of vacuum can be as low as 10 inches of Hg. It is preferred that the temperature heating be between 325 and 475° F. It is also preferred that the vacuum be at least 25 inches of Hg. By this method, any of the various types of laminated assemblies described above, including the wrap-around windshields and the windshields having a substantial transverse compound curvature with or without the end sections being twisted about the longitudinal axis, can be satisfactorily prepressed. As will be seen below, the method contemplates the prepressing of a group of laminated assemblies of relatively small size whether flat or curved. The method will be described below in greater detail in connection with the preferred embodiment using the apparatus of the present invention for purposes of illustration.

Referring now to the drawings which illustrate the preferred embodiment of the apparatus of this invention, the apparatus has a support table generally indicated at 11 comprising a pair of spaced vertical support members 12 and 13 that are maintained in spaced relationship by horizontal members 14. Support table 11 is provided with a flexible top surface 15 by stretching a flexible sheet 16 across the longitudinally convexed upper surfaces of support members 12 and 13 and securing sheet 16 to the members 12 and 13 by nails 17. The longitudinal curvature of the upper edge of support members 12 and 13 is determined approximately by projecting the profile of a curved laminated assembly, such as a windshield, from the approximate place where the windshield is to be placed on sheet 16 to the support members. However, because of the flexiblity of the top surface, the top profile of support members 12 and 13 only need be a rough approximation. It has been found that this apparatus is suitable for the preliminary pressing of the wide variety of windshield designs without any change in the curvature of support table 11.

Figure 4:
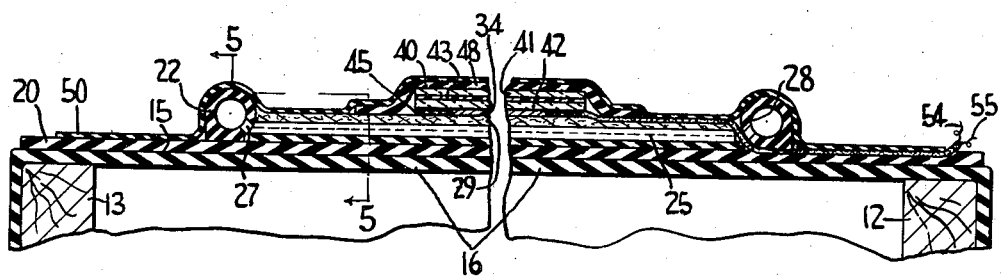
Fig. 4 is an enlarged fragmentary cross section of the preliminary pressing apparatus with a laminated glass assembly therein and taken along line 4—4 of Fig. 2.
Figure 5:
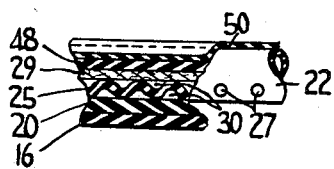
Fig. 5 is a fragmentary cross section taken substantially along line 5—5 of Fig. 4 showing in greater detail the nature of the various flexible sheets and part of the view showing the spacing of holes in the perimeter tubing.

A flexible sheet 20 is draped across the curved top surface 15 provided by sheet 16. Sheet 20 is provided on its top surface with a perimeter tubing 22 which is flat in a longitudinal portion of its bottom surface for sealing to the top surface of sheet 20. Outlet tubes 23 are connected to opposite sides of continuous perimeter tubing 22 and tubes 23 are connected to a vacuum pump (not shown). A flexible corrugated sheet 25 is on flexible sheet 20 within the area defined by tubing 22. The periphery of sheet 25 is adjacent tubing 22. As seen in Figs. 4 and 5 the corrugations of sheet 25 run transverse to the longitudinal axis of support table 11. Tubing 22 is provided with holes 27 spaced therealong and passing from the interior of the tubing downwardly through the inner wall 28 of tubing 22. A thermal-insulating flexible sheet 29 is on sheet 25 and its periphery, like sheet 25, is adjacent tubing 22. Sheet 29 is sufficiently porous to provide air passages upwardly from valleys 30 provided by corrugated sheet 25.

A flexible sheet 34 of a heat-resistant material, preferably a thermal-insulating material, is on thermal-insulating sheet 29. Sheet 34 has approximately the outline of the laminated curved glass assembly generally indicated at 40 and comprising two curved sheets of glass 41 and 42 separated by thermoplastic interlayer 43. A flexible electric strip heater 45 is affixed to sheet 34 and the area occupied by heater 45 is at least coextensive with the marginal area of laminated assembly 40. A flexible sheet 48 having an area slightly greater than the area of the laminated assembly 40 and with approximately the same outline is above flexible sheet 34. On flexible sheet 48 is a flexible sheet 50 which has a considerably greater degree of flexiblity than sheet 48. Sheet 50 completely covers the area defined by tubing 22 and extends sufficiently therebeyond before evacuation of the apparatus so that when part of the sheet is pulled downwardly within the area defined by the rib, a sufficient amount of the sheet 50 extends at least to the tubing 22 to be pulled thereagainst to maintain the vacuum being applied. Because the edges of sheet 50 are pulled inwardly a considerable distance when vacuum is applied due to the sheet being pulled downwardly within the area adjacent the tubing 22 and above sheet 25, it is preferred that sheet 50 extend at least three or four inches beyond tubing 22 when the apparatus is in the unevacuated condition.

Figure 2:
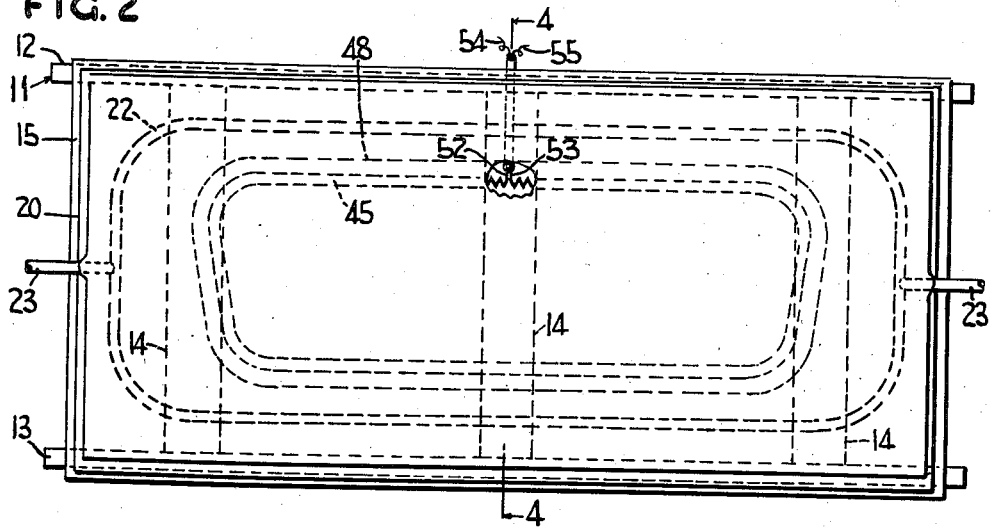
Fig. 2 is a top plan view, partially broken away, of the apparatus of Fig. 1.
Figure 3:
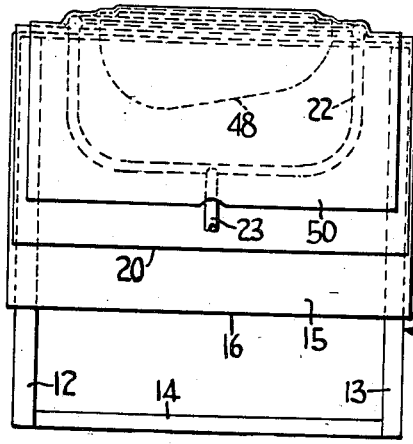
Fig. 3 is an end elevation of the apparatus of Fig. 1.

Flexible strip heater 45 extends around the perimeter desired to provide the proper marginal heating of assembly 40. Wires 52 and 53 of heater 45 are connected as shown in Fig. 2 to wires 54 and 55 that lie on sheet 34 and extend outwardly on sheet 20 and between tubing 22 and sheet 20. The ends of wires 54 and 55 are connected to an electrical source (not shown). The passageway provided between tubing 22 and sheet 20 is sealed around wires 54 and 55 to prevent air leakage underneath tubing 22 when vacuum is applied to the apparatus.

As shown in Fig. 4, laminated assembly 40 is placed between sheet 48 and strip heater 45 with heater 45 coinciding with or abutting the marginal area of laminated assembly 40.

Figure 6:
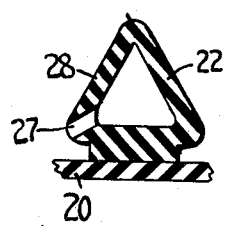
Fig. 6 is an enlarged cross section of an alternate form of perimeter tubing mounted on a flexible sheet and constructed with a flat face for easy sealing to the top surface of one of the flexible sheets of the apparatus.

In Fig. 6 is shown an alternate form of tubing 22 that can be used in place of tubing 22 shown in Fig. 6. It is seen that tubing 22 of Fig. 6 is substantially triangular in cross section and it is also provided wtih holes 27 downwardly extending in inner wall 28. Similar to tubing 22 of Fig. 4, it is of a construction that is noncollapsible when evacuated.

Figure 7:
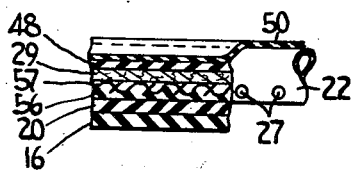
Fig. 7 is a fragmentary cross section of an alternate embodiment of the present apparatus, this view being a cross section like Fig. 5 but showing the use of a different sheet material for providing air passages from the perimeter tubing to the periphery of the laminated assembly.

Fig. 7 shows an alternate construction of part of the apparatus of this invention. The only difference from the construction shown in Fig. 5 is the use of a cotton-backed rubber sheeting 56 with the cotton backing 57 facing upward to provide air passages from holes 27 to the periphery of laminated assembly 40.

In Fig. 8 is shown schematically in general outline the apparatus of Fig. 1 except for flexible sheet 60 which takes the place of sheets 48 and 50 and is equivalent to making sheets 48 and 50 integral by cementing their opposing faces. It can be made, of course, by manufacture of a sheet material of greater thickness in the central area. One end of sheet 60 is fastened to roller 61 rotatably mounted to a fixed support (not shown). The other end of sheet 60 is fastened to wide-jaw extensible clamp 62 connected by spring 63 rotatably mounted to piston rod 64 which is raised and lowered by hydraulic cylinder 65 mounted on a fixed support 66.

In the foregoing description of strip heater 45, it was indicated that it was a single strip. It has been found particularly advantageous to provide the perimeter heating by the use of two strip heaters 45a and 45b, each of which would occupy a section of the periphery. These flexible strip heaters are connected in parallel as seen in Fig. 9. The end wires 67 and 68 for heaters 45a and 45b are connected in parallel to wires 69 and 70 connected to an electrical source (not shown).

OPERATION

Although the invention is not limited to particular materials and to specific thicknesses and other dimensions except insofar as they affect the properties desired of the specific components of the apparatus, details are presented below for purposes of illustration only.

Support members 12 and 13 and horizontal members 14 were constructed of wood. Support members 12 and 13 were spaced about 35 inches apart. Stretched and nailed to members 12 and 13 was a length of $\frac{1}{16}$-inch rubber sheeting that was 36 inches wide. The continuous or perimeter tubing of two-braid construction had a round cross section with ½-inch inner diameter. Holes 27, each ⅛ inch in diameter, were drilled at 2-inch intervals in tubing 22. The bottom of the tubing 22 was cut flat and the flat surface was sealed with rubber cement to sheet 20. Tubing 22 was made continuous by slipping the two ends over two arms of a copper T (not shown) forming a part of ½-inch inner diameter outlets. In other words, two sections of tubing 22 were used with their ends connected to copper T's forming part of outlets 23. Tubing 22 was sealed on sheet 20 so that when assembly 40 was placed on sheet 34 within the area defined by tubing 22, the periphery of the laminated curved glass assembly would be spaced from tubing 22 about 4 inches on the ends of the assembly and about 2 inches along the sides of the assembly. Sheet 25 was a corrugated rubber sheet having a thickness of ⅛ inch and about 8 corrugations to the inch.

Sheet 29 was a sheet of asbestos cloth having a thickness of $\frac{1}{16}$ inch. Sheets 25 and 29 were of such size and shape that their peripheries fit snugly or closely to tubing 22 to prevent sheet 59 from draping therebetween and shutting off air supply from holes 27 to the periphery of laminated assembly 40. Cotton-backed rubber sheet 56 shown in Fig. 7, an alternate for flexible corrugated sheet 25, was ⅛ inch thick and was flexible.

Sheet 34 to which heater 45 was sewn was $\frac{1}{16}$-inch asbestos cloth. Flexible strip heater 45 used was a standard 1-inch wide flexible strip heater that was flexible in all directions. It was a fiber glass cloth having sewed therein a fiber-glass-insulated copper wire that traversed a zigzag path along the band in the longitudinal direction.

Sheet 48 was ⅛-inch thick rubber. Its size was chosen so that it would extend 1 to 2 inches beyond the windshield laminated assembly edge to provide an edge pinch. The rubber sheet although flexible was sufficiently stiff to provide this pinching. Flexible sheet 50 was a $\frac{1}{32}$-inch rubber sheeting, 31″ x 80″, and thus extended several inches beyond tubing 22 when the apparatus was assembled and just before starting of evacuation.

The apparatus was assembled as shown in Fig. 4, except sheets 48 and 50 were not in position. A laminated glass assembly 40 was placed as shown so that the marginal area of assembly 40 was above band heater 45. Sheet 48 was then draped over assembly 40 so as to extend from one to two inches beyond assembly 40 at all points around the periphery of assembly 40. Then sheet 50 was draped over the entire assembly thus formed so that the marginal area of sheet 50 extended several inches beyond the entire periphery of tubing 22.

A vacuum pump connected to outlet tube 23 was started to evacuate air from between sheets 50 and 20 in the area defined by tubing 22. As will be seen below, the time of evacuation can be varied. The best evacuation time was dependent upon the number of conditions that will also be mentioned below. With evacuation of air from the chamber defined by tubing 22 and sheets 50 and 20, the difference in pressure between this chamber and the atmosphere above sheet 50 forced sheet 50, which was loosely draped across the area occupied by the continuous tubing, downwardly into contact with sheet 29. Sheet 50 also pulled downwardly sheet 48 to provide an edge pinching by sheet 48 on the top edge of laminated assembly 40. As soon as the evacuation desired was reached, electricity was passed through flexible heater 45 to heat the marginal area of laminated assembly 40 to the desired temperature mentioned above. After heating of the marginal area for the desired time, the heat was turned off and the vacuum released. Sheets 50 and 48 were removed. Laminated assembly 40 was removed from the apparatus.

The assembly 40 was examined to see whether or not any portion of the margin required a treatment known as edge rolling. This type of rolling of the edge comprised inserting a thin roller between the two sheets of glass at the edge at the point where the margin was not completely clear because of incomplete bonding. By inserting this thin roller into the space between the two glass sheets and moving the roller back and forth, the thermoplastic material was forced inwardly and against the hot glass surfaces to give bonding. Edge rolling insures that the entire margin is bonded sufficient to prevent oil penetration during the later autoclave treatment. Edge rolling has been used heretofore to correct deficiencies of preliminary pressing utilizing a pair of yieldable nipper rolls.

In the testing of the method and apparatus of the present invention, studies of the effect of time of evacuation and time of heating after evacuation were made, as well as the effect of temperature of the laminated assembly placed into the apparatus, on the quality of the laminated assembly obtained from the use of the prepressing apparatus followed by the standard autoclave treatment. The evaluation of the laminated assemblies from the method and apparatus of this invention in combination with the subsequent autoclave treatment included the standard 2-hour boil test which is a test described in American Standards Association Code for Safety Glazing Materials Z26.1–1950, Test No. 4.

Tests were also carried using a wide variation in the temperature between the perimeter heater 45 and the outer surface of glass assembly 40 at its margin at the end of the heating cycle. From these tests, it was determined that best results were obtained when the temperature at the end of the cycle was at least about 400° F.

Using the apparatus as described above, it was found to be possible to satisfactorily prepress a considerable number of different types of windshields. For example, successful results were obtained using the apparatus with the dimensions described above to prepress laminated assemblies for the production of wrap-around windshields for two different car manufacturers. There is a considerable difference in the dimensions and degrees of curvature in these windshields. In one of these types of windshields the end sections are bent about the longitudinal axis. The other one merely has a considerably smaller radius of curvature at the end sections adjacent the central section. With the same apparatus, it was even possible to satisfactorily prepress wrap-around windshields which were also provided with transverse curvature in the central section. Thus the wide versatility of the apparatus and method of the present invention is apparent.

This prepressing followed by the usual autoclave operation resulted in satisfactory windshields of various types when using the perimeter tubings 22 shown in Figs. 4 and 6 and either sheet 25 or sheet 56.

Using the apparatus shown in Figs. 1–4, a large number of curved windshields were preliminary pressed, i. e., prepressed. Some of these windshields were of the conventional wrap-around type. Others included those with the end sections bent about the longitudinal axis. To switch from prepressing of one pattern of windshield to another even though there were substantial differences in curvature, it was necessary only to change the perimeter heater 45 by removing it and sheet 34 to which it was sewn after disconnecting wires 52 and 53 from wires 54 and 55. It can be rapidly replaced by another flexible sheet 34 having sewn thereon a flexible perimeter heater 45 in the proper pattern to provide heat to the marginal area of the new pattern of windshield to be prepressed. Wires 52 and 53 were connected to wires 54 and 55 and then the apparatus was ready for the prepressing of the substantially different pattern than previously prepressed. The apparatus can be operated by one man.

In the evacuation step, the vacuum was held for about one minute before turning on the perimeter heater 45. Heating was then carried out for about three to four minutes, the actual time depending upon the windshield pattern. A four to five minute total cycle was decided to provide optimum use of the apparatus.

These windshields that have been prepressed as described above, when removed from the apparatus were found to have an unheated and incompletely bonded but evacuated center portion surrounded by a clear bonded portion completely around the edge. The prepressed windshields required only a small amount of edge rolling, viz., about three inches per windshield due to occasional edge spots which did not seal clear. No unclear edge spots were encountered that after edge rolling were insufficiently sealed into the central area to allow fluid into the laminate and cause an unsatisfactory assembly when the prepressed assembly was subjected to the treatment at elevated temperature and pressure, e. g., the autoclave operation.

Autoclave operation comprises immersing the prepressed assembly directly in the fluid, e. g., oil at an elevated temperature, e. g., 150° F., subjecting the oil to an elevated pressure, such as 100–250 p. s. i., preferably about 200 p. s. i., heating the fluid under said pressure and temperature, e. g., 190 to 325° F., for a few minutes, e. g., 30 minutes. The fluid is cooled, e. g., to 150° F., and the pressure removed. The assembly is removed and fluid removed from its surfaces.

*Example I*

More than 100 of the wrap-around windshields of the various types have been subjected to the apparatus of this invention in accordance with the method of the invention. After the prepressing and edge rolling as required they were subjected to final pressing in the autoclave under the standard conditions, viz., 30 minutes at 275° F. and 200 pounds per square inch. Sheet 25 was used in the apparatus in lieu of sheet 56 in some of the tests. Seventy windshields of those treated constituted one pattern each of two different automobile manufacturers, viz., windshields for the 1955 Plymouth and the 1955 Ford Thunderbird. None of the windshields from the final autoclaving were rejectable as containing air bubbles or containing fluid that had penetrated into the laminate.

*Example II*

Twenty-eight wrap-around windshields were preevacuated for periods of from 0 to 5 minutes followed by 3 minutes of heating while remaining under evacuated conditions and then subjected to the standard final pressing in an autoclave. The apparatus used cotton-backed rubber sheet 56. Then the windshields were subjected to the ASA 2-hour boil test mentioned above. This heat stability test determines the efficiency of air removal from between the sheets in the evacuation step. The results are tabulated below. In these tests the vacuum used during the evacuation step was about 25 inches of mercury. The temperature between the perimeter heater 45 and the outer surface of the adjacent glass sheet at the end of the cycle averaged about 400° F.

| Evacuation Time before Heat Turned on | No. of Windshields Boil Tested | No. of Windshields that Bubbled | Avg. No. of Bubbles in Windshields that Bubbled | | |
|---|---|---|---|---|---|
| | | | Driver End | Middle Section | Passenger End |
| Minutes: | | | | | |
| 0 | 7 | 7 | 17 | 6 | 13 |
| 1 | 7 | 6 | 2 | 0 | 3 |
| 3 | 7 | 1 | 2 | 0 | 0 |
| 5 | 7 | 0 | 0 | 0 | 0 |

The foregoing results show that the heat stability is very poor if no pre-evacuation is used. The results can be compared with the same test on eight windshields of the same pattern that had been preliminary pressed by means of a machine using a pair of yieldable nipper rolls rotatably mounted in a housing followed by edge rolling and the standard autoclave treatment. In the 2-hour boil test of those windshields, six of them bubbled. The average number of bubbles in those six windshields were six in the driver end, none in the middle section and three in the passenger end. Thus a pre-evacuation of one minute in the apparatus of the present invention produces products that are as good or better than those using the nipper roll type of apparatus for prepressing.

When curved windshields are run consecutively through the apparatus, the heating time falls off from a range of 3 to 4 minutes to a range of 2 to 2½ minutes because of the retained heat in the prepressing apparatus from the previous run. Of course, heater 45 is shut off before removal of vacuum. Otherwise the next assembly that would be placed on top of the strip heater 45 would have a partial sealing of at least the marginal area before evacuation was started. For best results, it is preferred that laminated glass assembly 40 be no warmer than about 70° F. when placed in the assembly.

In the foregoing examples, strip heater 45 extended completely around the desired area using 120 volts and 10 amperes of current. It has been found that, when the area was heated by two band heaters 45a and 45b, each occupying one-half of the substantially continuous band and connected in parallel with a voltage of 250 volts, it was possible to more rapidly heat the marginal area of the assembly. As a result, satisfactory prepressing was obtained with a heating time of only 1½ minutes preceded by an evacuation of only 1 minute for a total time cycle of about 2½ minutes. Of course, change in gauge of wire in heater 45 with change in voltage can decrease heating time.

In another variation of the heating element, a blanket electrical heater that is flexible in all directions has been found to be satisfactory. It seals the marginal area sufficiently to prevent fluid penetration and the central area is completely sealed by the autoclave operation. Other variations have been tried successfully, for example, two strip heaters have been used in side by side relationship to widen the area of the continuous band being heated thereby making less critical the placing of laminated glass assembly 40 with respect to flexible heater 45.

*Example III*

Using a blanket heater instead of strip heater 45, three curved laminated goggle lenses were placed on the electric woven blanket and covered with sheets 48 and 50 as heretofore described for the curved assemblies. The goggle glass samples had a sharp wrap-around bend on each end and were made of 1/16-inch glass and 0.015-inch thick vinal. They had a 6-inch chord, were 3¼ inches wide and 7½ inches long along the glass surface. They were supported on sheet 16 in a concave down position over a ridge support made of rolled asbestos cloth. Two minutes was the evacuation time. The total cycle time was ten minutes. Several batches of three curved laminated goggle lenses were treated in this manner. Satisfactory prepressing was obtained with this multiple treatment of small laminated assemblies. Of course, with a better heater, the time could be considerably shortened.

In the lamination of small flat laminated assemblies, a number of them can be laminated or prepressed together using the apparatus and method described above but, in such a case, as in the lamination of a large laminated flat glass assembly, resilient sheet 16 is preferably flat.

In the foregoing description of prepressing of this invention, it has been noted that sheet 48 is pulled down during the evacuation and provides pinching of the top edge of assembly 40 to obtain a better sealing of the marginal area of assembly 40. It has also been pointed out that sheet 50 is pulled down against sheet 48 where they occupy a common area and beyond that area is pulled down against sheet 29. Sheet 25 or 56 provides or insures air passage from holes 27 to the edge of laminated assembly 40 by cooperating with passages in sheet 29. Thus sheets 25 and 29 cooperate to insure that air passages from holes 27 and the periphery of laminated assembly 40 during the evacuation step. Holes 27 are preferably downwardly disposed to insure that sheet 50, when pulled down tightly against tubing 22, is not pulled down so far as to close these holes and thereby prevent the evacuation of laminated assembly 40. The bottom surface of sheet 50 and the surface of tubing 22 are preferably smooth to insure that sheet 50 will be pulled down airtight against tubing 22 during the evacuation.

In the foregoing examples sheet 34 with heater 45 sewn to its top surface was below laminated glass assembly 40 as shown in Fig. 4. Experiments were carried out with flexible sheet 34 reversed so that heater 45 was on its bottom surface. The laminated glass assembly 40 was placed directly on sheet 29. Sheet 34 was placed over assembly 40 with heater 45 in contact with assembly 40. Sheets 48 and 50 were draped thereover in the usual order. The apparatus was evacuated, etc., as described above. Satisfactory curved laminated glass windshields were made by this modified procedure.

In the foregoing description, support table 11 had a convex top surface 15 and assemblies 40 were prepressed with the ends pointing downwardly. The surface 15 can be concave and curved windshield will be placed in the apparatus with ends pointing upwardly.

Various modifications of support table 11 can provide enhanced support by flexible sheet 16 of a compound curved windshield. For example, the entire support table can be built to form a chamber with flexible sheet 16 forming the roof. Air can be pumped into the chamber after placing the assembly on sheet 34. The increase in pressure will force sheet 16 into contact with a greater area of the windshield. Of course, the chamber with sheet 16 as its roof can occupy an upper portion only of support table 11.

While the foregoing description describes the invention in connection with the preferred embodiment and certain alternative modifications thereof, various other modifications will be suggested to persons skilled in the art. For example, apparatus for moving a laminated assembly into position followed by mechanical moving of the sheets 48 and 50, integral or not, into position before application of the vacuum and heating can be used as shown partially in Fig. 8 and described above. A mechanism for a timing cycle is clearly suggested from the foregoing description of the method and apparatus of this invention. Also sheet 20 can be eliminated by mounting tubing 22 directly on sheet 16. Accordingly, the invention is not limited by the foregoing but only by the claims that follow.

We claim:

1. The method of prepressing at least the marginal area of an assembly comprising two matched sheets of glass and a thermoplastic interlayer, which comprises supporting the assembly on a flexible sheet within an area of the sheet defined by a continuous rib on the top surface of the sheet and spacing the periphery of the assembly from the rib, placing a flexible cover sheet over the assembly and the rib to cover the entire area of the flexible sheet defined by the rib and to maintain a conduit around the periphery of the assembly, evacuating the conduit through the rib while maintaining air passages from the periphery of the assembly to the point of evacuation at the rib, maintaining the vacuum while heating at least the marginal area of the glass sheets and interlayer, releasing the vacuum, removing the cover sheet and removing the assembly of glass sheets and interlayer.

2. The method of prepressing at least the marginal area of a curved assembly comprising two matched sheets of curved glass and a thermoplastic interlayer, which comprises supporting the assembly on a curved flexible sheet within an area of the sheet defined by a continuous rib on the top surface of the curved sheet and spacing the periphery of the assembly from the rib, placing a flexible cover sheet over the assembly and the rib to cover the entire area of the curved flexible sheet defined by the rib to provide and to maintain a conduit around the periphery of the assembly, evacuating the conduit through the rib while maintaining air passages from the periphery of the assembly to the point of evacuation at the rib, maintaining the vacuum while heating at least the marginal area of the glass sheets and interlayer, releasing the vacuum, removing the cover sheet and removing the assembly of glass sheets and interlayer.

3. The method of claim 2 wherein the marginal area only of the assembly is heated.

4. The method of claim 2 wherein the heating step is carried out entirely under substantially atmospheric pressure.

5. The method of claim 4 wherein the step of heating the assembly is heating of the marginal area only of the assembly.

6. The method of claim 2 wherein the curved glass sheets have a longitudinal curvature with a minimum radius of curvature in the areas of the end sections adjacent to the central section of the glass sheets.

7. The method of claim 2 wherein the curved glass sheets have a longitudinal curvature and the end sections of the glass sheets are twisted about the longitudinal axis to provide an assembly having a central section that is cylindrical and conical end sections.

8. The method of claim 2 wherein the curved glass sheets have a longitudinal curvature and have a transverse curvature at least in the central section of the glass sheets.

9. Apparatus for the preliminary pressing of a laminated assembly comprising two matched sheets of glass and a thermoplastic interlayer, said apparatus comprising a supporting member, a first flexible sheet mounted on the supporting member to provide a yieldable top surface portion, a rib mounted on said top surface portion to define an area on said top surface portion, at least a portion of said rib having a longitudinal conduit and a gas-permeable inner side wall for the portion of the rib containing the conduit, evacuating means connected to said conduit, a flexible electric heater mounted above said top surface portion and within the area defined by said rib, said heater being adapted to provide heating of at least the marginal area of the laminated assembly, a second flexible sheet within the area defined by the rib and extending entirely across and beyond the area defined by said marginal area of heating, a third flexible sheet on said second flexible sheet and having a substantially greater flexibility than said second flexible sheet and extending entirely across the area defined by the rib and lying on the rib, and means between said top surface and said second and third flexible sheets for providing air passages from the permeable inner side wall in the rib to the periphery of the marginal area defined by the laminated assembly, said third flexible sheet being sufficiently large to be in sealing contact with said rib above said permeable side wall portion during evacuation between the first and third flexible sheets.

10. Apparatus for the preliminary pressing of a curved laminated assembly comprising two matched sheets of curved glass and a thermoplastic interlayer, said apparatus comprising a supporting member, a first flexible sheet mounted on the supporting member to provide a yieldable curved top surface portion, a rib mounted on said top surface portion to define an area on said top surface portion, at least a portion of said rib having a longitudinal conduit and having holes extending through the inner side wall of the portion of the rib containing the conduit, evacuating means connected to said conduit, a flexible electric heater mounted above said top surface portion and within the area defined by said rib, said heater being adapted to provide heating of at least the marginal area of the laminated assembly, a second flexible sheet within the area defined by the rib and extending entirely across and beyond the area defined by said marginal area of heating, a third flexible sheet on said second flexible sheet and having a substantially greater flexibility than said second flexible sheet and extending entirely across the area defined by the rib and lying on the rib, and means between said top surface and said second and third flexible sheets for providing air passages from the holes in the rib to the periphery of the marginal area defined by the laminated assembly, said third flexible sheet being sufficiently large to be in sealing contact with said rib above said holes during evacuation between the first and third flexible sheets.

11. Apparatus for the preliminary pressing of a curved laminated assembly comprising two matched sheets of curved glass and a thermoplastic interlayer, said apparatus comprising a supporting member having a flexible convex top surface portion, a first flexible sheet on said flexible convex top surface portion and having mounted thereon a continuous tubing, said tubing being sealed at its bottom portion to said flexible sheet and having holes extending through the inner side of the wall, evacuating means connected to said tubing, a flexible electric heater mounted above said first flexible sheet and within the area defined by said tubing, said heater being adapted to provide heating of at least the marginal area of the laminated assembly, a second flexible sheet within the area defined by the tubing and extending entirely across and beyond the area defined by said marginal area of heating, a third flexible sheet on said second flexible sheet and having a substantially greater flexibility than said second flexible sheet and extending entirely across the area defined by the tubing and lying on the tubing, and means between said first flexible sheet and said second and third flexible sheets for providing air passages from the holes in the tubing to the periphery of said marginal area defined by the laminated assembly when the tubing is evacuated by said evacuating means, said third flexible sheet extending sufficiently beyond the tubing before evacuation to ensure a sealing contact with the tubing above the holes during evacuation through said holes and conduit.

12. Apparatus for the preliminary pressing of a curved laminated assembly comprising two matched sheets of curved glass and a thermoplastic interlayer, said apparatus comprising a supporting table including a pair of spaced vertical supports having longitudinally convexed top surfaces and a first flexible sheet secured to said convexed top surfaces of said vertical supports to provide a curved resilient top surface portion for said supporting table, a second flexible sheet on the curved top surface portion and having sealed to its top surface a continuous tubing, said tubing having holes extending downwardly through the inner side of the wall, evacuating means connected to said tubing, a third flexible sheet mounted above said second flexible sheet and within the area defined by said tubing, a flexible electric heater mounted above the third flexible sheet and within the area defined by said tubing, said heater being adapted to provide heating of at least the marginal area of the laminated assembly, the periphery of said third flexible sheet being adjacent the tubing and the top surface of the third flexible sheet being irregular to provide air passages from the holes of the tubing to the periphery of the laminated assembly, a fourth flexible sheet within the area defined by the tubing and extending entirely across and beyond the area defined by said marginal area of heating, a fifth flexible sheet on said fourth flexible sheet and having a substantially greater flexibility than said fourth flexible sheet and extending entirely across the area defined by the tubing and lying on and sufficiently beyond the tubing before evacuation to insure a sealing contact with the tubing above the holes during evacuation through said holes and conduits.

13. Apparatus of claim 12 wherein the third flexible sheet has a corrugated upper surface.

14. The apparatus of claim 13 wherein the third flexible sheet is a rubber sheet, said apparatus including a sixth flexible thermal-insulating woven sheet between the third flexible sheet and the flexible electric heater.

15. The apparatus of claim 13 wherein the electric heater is a flexible woven strip heater to provide heating to the marginal area only of the curved laminated assembly.

16. The apparatus of claim 15 wherein the strip heater is mounted on a thermal-insulating sheet.

17. The apparatus of claim 12 wherein the third flexible sheet is a cotton-backed rubber sheet with the cotton backing providing the top surface.

18. The apparatus of claim 17 wherein a sixth flexible sheet of thermal-insulating material is between the third flexible sheet and the heater.

19. The apparatus of claim 18 wherein the heater is a flexible woven heater strip mounted on a heat-resistant sheet to provide a heating area defined by the marginal area of the laminated assembly.

References Cited in the file of this patent

UNITED STATES PATENTS

| | | |
|---|---|---|
| 1,870,284 | Drake | Aug. 9, 1932 |
| 2,376,805 | Peacock | May 22, 1945 |
| 2,673,822 | Dennison et al. | Mar. 30, 1954 |
| 2,700,632 | Ackerlind | Jan. 25, 1955 |
| 2,713,378 | Nadler et al. | July 19, 1955 |
| 2,714,567 | Cravener | Aug. 2, 1955 |